United States Patent
Delord et al.

(10) Patent No.: US 10,272,953 B2
(45) Date of Patent: Apr. 30, 2019

(54) FRONT BULKHEAD FOR A MOTOR VEHICLE

(71) Applicant: RENAULT s.a.s., Boulogne Billancourt (FR)

(72) Inventors: Christian Delord, Versailles (FR); Fabien Hue, La Boissiere Ecole (FR)

(73) Assignee: RENAULT s.a.s., Boulogne Billancourt (FR)

( * ) Notice: Subject to any disclaimer, the term of this patent is extended or adjusted under 35 U.S.C. 154(b) by 211 days.

(21) Appl. No.: 15/330,792

(22) PCT Filed: Apr. 17, 2015

(86) PCT No.: PCT/FR2015/051056
§ 371 (c)(1),
(2) Date: Jun. 5, 2017

(87) PCT Pub. No.: WO2015/170024
PCT Pub. Date: Nov. 12, 2015

(65) Prior Publication Data
US 2017/0274938 A1    Sep. 28, 2017

(30) Foreign Application Priority Data

May 7, 2014    (FR) .................................... 14 54105

(51) Int. Cl.
*B60J 7/00*    (2006.01)
*B62D 25/14*    (2006.01)
(Continued)

(52) U.S. Cl.
CPC ......... *B62D 25/14* (2013.01); *B62D 25/2045* (2013.01); *B62D 25/08* (2013.01)

(58) Field of Classification Search
CPC .... B62D 25/082; B62D 21/11; B62D 25/084; B62D 21/152; B62D 25/088; B60R 19/34; B60R 1/06; B60R 2021/343
(Continued)

(56) References Cited

U.S. PATENT DOCUMENTS 2,664,308 A * 12/1953 Appel ................. B62D 25/082
180/68.5
4,457,555 A * 7/1984 Draper .................. B62D 21/10
29/401.1
(Continued)

FOREIGN PATENT DOCUMENTS

WO    99/57002 A1    11/1999

OTHER PUBLICATIONS

International Search Report dated Jul. 14, 2015 in PCT/FR2015/051056 filed Apr. 17, 2015.
(Continued)

*Primary Examiner* — Kiran B Patel
(74) *Attorney, Agent, or Firm* — Oblon, McClelland, Maier & Neustadt, L.L.P.

(57) ABSTRACT

A front bulkhead for a motor vehicle includes a bodyshell floor fitted with a tunnel including a lower edge, an upper edge, and two lateral sides. The lower edge and the upper edge are continuous and substantially parallel. The lower edge has no cutout at a junction with the tunnel of the bodyshell floor of the vehicle. The lateral sides have solid portions incorporating a shape of wheel arches.

12 Claims, 2 Drawing Sheets

(51) Int. Cl.
*B62D 25/20* (2006.01)
*B62D 25/08* (2006.01)

(58) Field of Classification Search
USPC .......................... 296/203.02, 187.09, 193.09
See application file for complete search history.

(56) References Cited

U.S. PATENT DOCUMENTS

| | | | | |
|---|---|---|---|---|
| 4,514,008 A * | 4/1985 | Watanabe | ............ | B60K 15/073 280/835 |
| 4,574,915 A * | 3/1986 | Gahlau | ..................... | B32B 5/18 181/290 |
| 4,613,184 A * | 9/1986 | Rispeter | ................. | B62D 65/04 280/781 |
| 4,826,234 A * | 5/1989 | Komatsu | .................. | B62D 1/16 280/779 |
| 5,005,898 A * | 4/1991 | Benedetto | ............. | B60R 13/083 296/191 |
| 5,234,246 A * | 8/1993 | Henigue | .............. | B60H 1/0055 180/90 |
| 5,560,674 A * | 10/1996 | Tazaki | ................... | B62D 21/09 296/193.01 |
| 6,237,439 B1 * | 5/2001 | Weber | ...................... | B62D 1/16 280/777 |
| 6,402,226 B2 * | 6/2002 | Park | ........................ | B62D 33/06 296/190.08 |
| 6,830,289 B2 * | 12/2004 | Miyabayashi | ........ | B62D 25/082 296/193.07 |
| 6,840,570 B2 * | 1/2005 | Bock | ..................... | B62D 33/06 296/187.08 |
| 6,974,172 B2 * | 12/2005 | Gebreselassie | ....... | B60R 13/083 180/90 |
| 7,052,078 B2 * | 5/2006 | Akasaka | ............... | B62D 25/081 296/191 |
| 8,297,687 B2 * | 10/2012 | Mildner | ............... | B62D 25/081 296/192 |
| 8,585,134 B2 * | 11/2013 | Yasui | ................... | B62D 21/152 296/204 |
| 8,814,248 B2 * | 8/2014 | Mildner | ................. | B62D 25/08 296/187.08 |
| 8,925,991 B2 * | 1/2015 | Caliskan | ................ | B62D 25/20 296/193.07 |
| 9,180,916 B2 * | 11/2015 | Nishida | ............... | B62D 25/2036 |
| 9,266,567 B1 * | 2/2016 | Young | .................... | B62D 24/04 |
| 9,776,671 B2 * | 10/2017 | Song | .................... | B62D 25/145 |
| 9,821,857 B2 * | 11/2017 | Cesarano | ........... | B62D 25/2009 |
| 2003/0085591 A1 | 5/2003 | Seksaria et al. | | |
| 2003/0205916 A1 * | 11/2003 | Seksaria | .................. | B60K 5/12 296/192 |
| 2004/0183339 A1 | 9/2004 | Seksaria et al. | | |
| 2004/0189055 A1 * | 9/2004 | Tomita | ................. | B62D 25/082 296/203.02 |
| 2007/0102222 A1 * | 5/2007 | Tanaka | ................... | B60K 13/02 180/291 |
| 2009/0243343 A1 * | 10/2009 | Tamakoshi | ............. | B62D 25/04 296/204 |
| 2011/0272970 A1 * | 11/2011 | Usuda | .................. | B62D 25/082 296/193.09 |
| 2013/0264843 A1 * | 10/2013 | Toba | ..................... | B62D 21/02 296/204 |
| 2014/0152051 A1 * | 6/2014 | Saitou | .................... | B62D 21/15 296/187.09 |

OTHER PUBLICATIONS

French Search Report dated Jan. 6, 2015 in FR 1454105 filed May 7, 2014.

* cited by examiner

FRONT BULKHEAD FOR A MOTOR VEHICLE

BACKGROUND

The invention concerns a front bulkhead for a motor vehicle, the bodyshell floor of which is fitted with a tunnel. More particularly, the invention concerns a front bulkhead for a vehicle with the engine mounted at the rear.

The bulkhead is a generally flat partition of vertical and transverse orientation, which is intended to ensure comfort and maximum safety for the vehicle passengers. Reference is made to documents FR 2803813, EP 1073579 and EP 1920999 which illustrate examples of a front bulkhead for a motor vehicle.

Amongst others, the bulkhead ensures the acoustic isolation of the cab. Damping elements such as foams are for example glued onto the bulkhead to absorb a large portion of the vibrations and thus reduce the sound level and vibrations in the cab.

An important function of the bulkhead is to ensure the safety of the vehicle passengers, in particular on a frontal impact. The front bulkhead is therefore generally designed so as to prevent any direct contact between the front part of the vehicle and the cab.

Another function of the front bulkhead is to allow the passage of elements which extend both into the cab and into the front part of the vehicle, such as the steering column, the control pedals for the engine and brakes of the vehicle.

Other elements extend in the longitudinal plane of the vehicle and must therefore generally pass through the cab and the front bulkhead. This is the case for example for the vehicle engine's exhaust pipe. The bodyshell floors of motor vehicles are generally equipped with a tunnel extending in the longitudinal direction of the vehicle, the function of which is to protect these elements and in particular the engine exhaust pipe.

Also, the front wheels of some vehicles are not always fully situated in front of the front bulkhead.

Thus it appears in documents FR 2803813, EP 1073579 and EP 1920999 that these front bulkheads are provided with:
openings for the cables of the acceleration, clutch and brake pedals and for the steering column,
recesses for the front wheels of the vehicle, and
a cutout for the tunnel of the bodyshell floor.

A front bulkhead is generally produced by deep-drawing. A rectangular metal sheet is deep-drawn to produce the openings, recesses and cutout. Deep-drawing also allows adaptation of the bulkhead shape to the architecture of the motor vehicle. The rectangular metal sheet is naturally of a greater mass than the finished part. Part of the sheet constitutes the finished part while the remainder constitutes waste, i.e. unused material.

In production of a bulkhead, the material usage represents the ratio between the mass of the finished part and the mass of the sheet used. During production, the aim is to lose as little material as possible when manufacturing the part. Therefore, generally, the aim is to maximize the material usage. The material usages generally achieved are of the order of 55%.

BRIEF SUMMARY

In view of the above, the object of the invention is to propose a bulkhead designed such that it can be produced by deep-drawing with a high material usage.

According to a first aspect, a front bulkhead provided for a motor vehicle, the bodyshell floor of which is fitted with a tunnel, comprises a lower edge, an upper edge and two lateral sides. The lower and upper edges are continuous and substantially parallel, the lower edge having no cutout at the junction with the tunnel of the bodyshell floor of the vehicle, the lateral sides having solid portions incorporating the shape of the wheel arches.

Such a bulkhead formed from one single piece is designed so as to use the raw material of production in an optimized fashion. In certain embodiments, such a part may be produced by deep-drawing with a material usage of more than 69%. A better material usage offers advantages in terms of the cost price for manufacture of the part. Also, the bulkhead has a stronger structure and less risk of corrosion.

Advantageously, the front bulkhead comprises a first substantially vertical surface arranged at the front, and a second adjacent surface inclined towards the rear when the bulkhead is mounted in the vehicle.

Also, it may be provided that the solid portions incorporating the shape of the wheel arches comprise a junction surface of substantially conical and curved form.

Advantageously, the first surface is designed for mounting of the pedals and the steering column. In a first variant, the bulkhead comprises an opening made in the first surface and intended for the mounting of a separate reinforcement. In a second variant, the first surface has a blind cavity in which four threaded holes are made.

In one embodiment, the second surface has a recess forming a hollow body designed to house the end of the tunnel of a bodyshell floor of the vehicle.

According to a second aspect, a motor vehicle comprises a bodyshell floor fitted with a tunnel extending in the longitudinal direction of the vehicle and a front bulkhead as defined above.

Advantageously, a mastic seal is arranged along the lower and upper edges and the lateral sides of the front bulkhead.

The absence of a cutout in the second surface of the front bulkhead at the level of the tunnel is then advantageous since the bulkhead has a shorter length to be sealed.

BRIEF DESCRIPTION OF THE DRAWINGS

Further aims, characteristics and advantages of the invention will appear from reading the description below, which is given purely as a non-limitative example, and with reference to the attached drawings on which.

DETAILED DESCRIPTION

Figure 1:
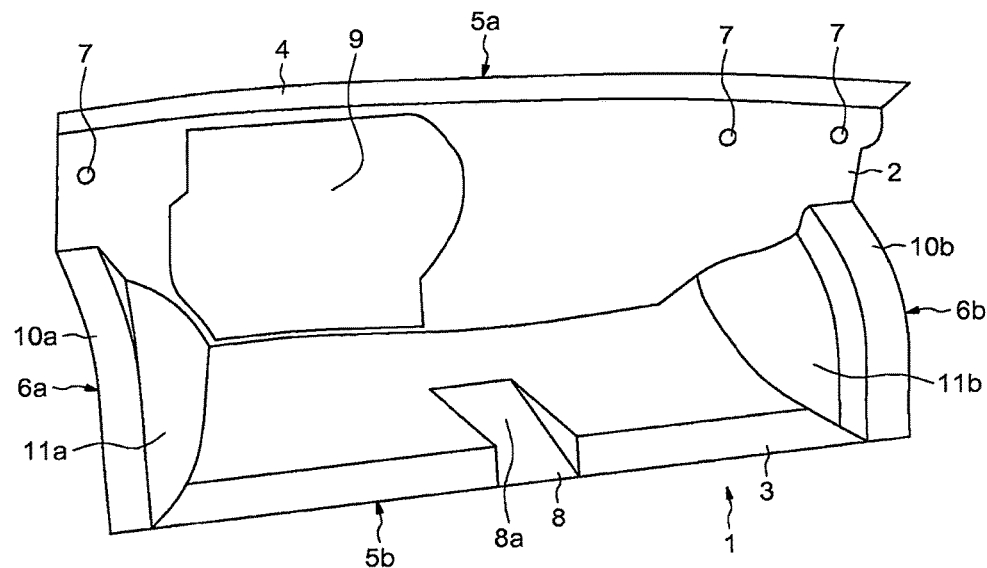
FIG. 1 shows diagrammatically front bulkhead according to a first embodiment.

FIG. 1 shows a diagrammatic perspective view of a front bulkhead 1 according to a first embodiment.

The front bulkhead 1 consists of a single piece of shaped sheet metal, made for example by deep-drawing from a flat sheet. The front bulkhead 1 therefore comprises a first substantially flat surface 2 with local deformations. The first surface 2 is substantially vertical and arranged towards the front when the bulkhead 1 is mounted in the vehicle. The bulkhead 1 comprises a second adjacent surface 3 which is inclined towards the rear relative to the first surface 2 when the bulkhead 1 is mounted in the vehicle. An upper rim 4 is adjacent to the second surface 2.

The front bulkhead 1 comprises an upper edge 5a belonging to the rim 4, and a lower edge 5b belonging to the second surface 3. We also designate two sides: a left side 6a and a right side 6b (in relation to FIG. 1). The upper 5a and lower 5b edges are continuous and substantially parallel to each other. As a result, the bulkhead 1 has a generally rectangular form.

The front bulkhead 1 is intended to be incorporated in the structure of a motor vehicle, generally comprising a bodyshell floor, a bonnet support, a front crossmember and two lateral flanks of bodywork. The upper edge 5a is intended to be held against the bonnet support (not shown). The lower edge 5b is intended to be in contact with the bodyshell floor 12 (shown on FIG. 2). The left and right sides 6a and 6b are respectively intended to be arranged in contact with the left and right lateral flanks of the bodywork (not shown). Three identical holes 7 are made in the first surface 2, to allow fixing of the surface 2 to the vehicle's crossmember (not shown) by means of bolts (not shown). In addition, welds may be produced at the edges 5a and 5b and at the sides 6a and 6b. Thus by means of the edges 5a and 5b, the sides 6a and 6b, and the holes 7, the front bulkhead 1 is designed to be incorporated in the structure of the vehicle.

Conventionally, the bodyshell floor 12 of the vehicle is fitted with a tunnel 13, generally extending over the entire length of the vehicle. The tunnel 13 of the bodyshell floor 12 is therefore generally arranged in contact with or passing through the front bulkhead 1 of the vehicle, defining a junction zone of the bulkhead with the tunnel. In the example shown, with the engine at the rear, it is not necessary for the tunnel 13 to pass through the bulkhead 1. The junction zone forms part of the second surface 3 which has a recess forming a closed hollow body 8, arranged on the central part of the second surface 3 and intended to house the front end of the tunnel 13 of the bodyshell floor 12 of the vehicle. To this end, the recess 8 is preferably delimited by a surface portion 8a which is more inclined than the second surface 3, in order to receive the tapered end of the tunnel 13.

The front bulkhead 1 also comprises an opening 9 arranged on the first surface 2. The opening 9 is designed for mounting of a separate reinforcement (visible on FIG. 2), integrating for example means for passage of the steering column and control pedals of the vehicle.

On its left side 6a (in relation to FIG. 1), the front bulkhead 1 has a solid portion incorporating a left wheel arch 10a, comprising a junction surface 11a of substantially conical or curved form. These local deformations of the solid portion can easily be produced by deep-drawing. The front bulkhead 1 also comprises on its right side 6b, symmetrically, a right wheel arch 10b comprising a junction surface 11b which is substantially conical or curved.

Figure 2:
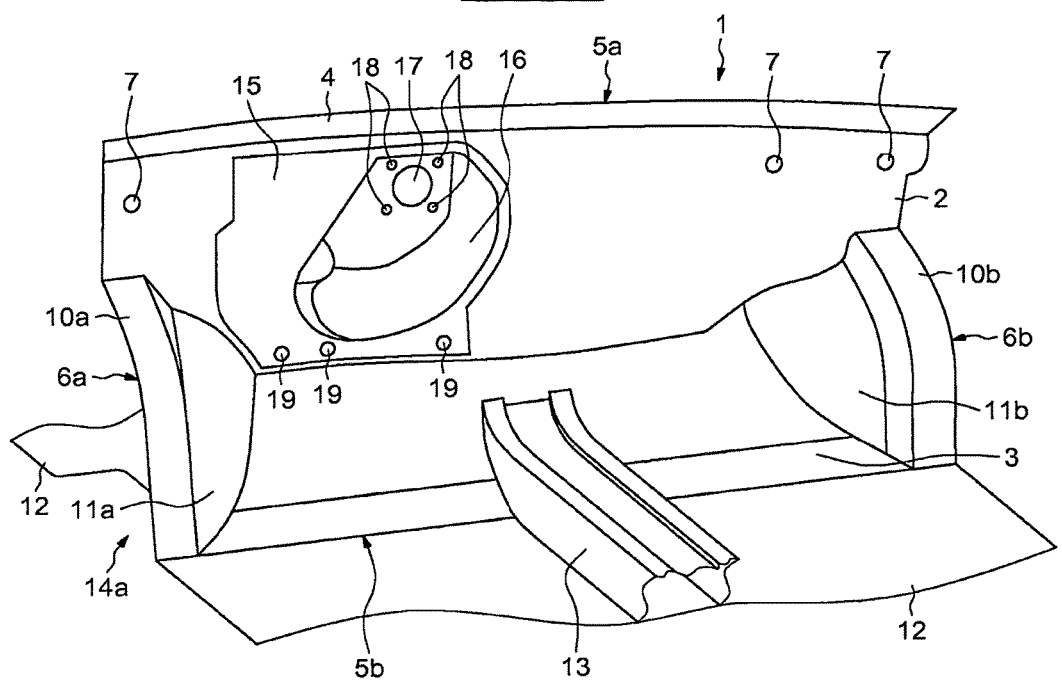
FIG. 2 shows diagrammatically the front bulkhead of FIG. 1 arranged on the bodyshell floor of a motor vehicle.

FIG. 2 shows the front bulkhead 1 arranged on the bodyshell floor 12 of the motor vehicle. In this example, the engine of the motor vehicle is arranged at the rear.

The bodyshell floor 12 is a flat surface on which the tunnel 13 is mounted and in which wheel arches 14a and 14b are made (only the left wheel arch 14a is visible on FIG. 2). Fixing means (not shown) allow the bodyshell floor 12 to be fixed to the front bulkhead 1 at the level of the lower edge 5b of the latter. The tunnel 13 does not pass through the front bulkhead 1 and stops against the hollow body 8, which reinforces the assembly of the floor 12 to the bulkhead 1.

In this example, the front bulkhead 1 comprises a reinforcement 15 mounted in the opening 9. The reinforcement 15 comprises a cavity 16 and a hole 17 intended for mounting of the vehicle's steering column (not shown). Four identical threaded holes 18 are made for fixing the vehicle's steering column to the reinforcement 15 of the front bulkhead 1, at the level of the cavity 16. The reinforcement 15 finally comprises three holes 19 intended for the cables of the vehicle's control pedals, for example the cables of the accelerator pedal, brake pedal and clutch pedal.

In this example, the opening 9 is situated in the left center part of the bulkhead 1, to allow installation of the driver's controls on the left-hand side of the vehicle. Naturally, without leaving the scope of the invention, a bulkhead could be considered with the same characteristics but with an opening in the right center part for mounting a reinforcement which is symmetrical to the reinforcement 15.

In this way, the front bulkhead 1 is a part of substantially rectangular form with local deformations. It could be produced by deep-drawing from a rectangular metal sheet. The absence of cutout for the tunnel and the integration of the wheel arches in a solid portion improve the material usage. It is considered that such a form of front bulkhead allows a material usage of more than 69%, which is far higher than the average material usage of a front bulkhead which is estimated to be around 55%.

In this example, the bulkhead substantially has a weight of 5.73 kg. For production by deep-drawing, the metal sheet used has a mass of 8.23 kg, giving a material usage of 69.5%. To produce by deep-drawing the same bulkhead with conventional characteristics and with a material usage of 55%, as in documents FR 2803813, EP 1073579 and EP 1920999, it is necessary to use a metal sheet of 10.4 kg or almost 2.2 kg more of metal sheet.

Such an architecture therefore allows a reduction of the cost price for production of the bulkhead, and an improvement of its structure and corrosion resistance.

Figure 3:
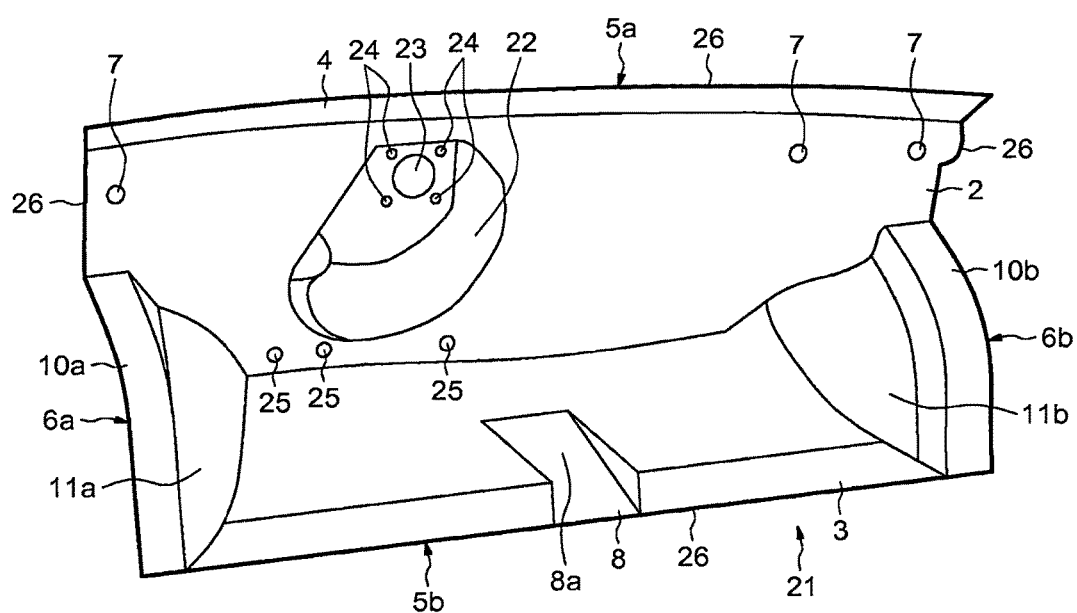
FIG. 3 shows a front bulkhead according to a second embodiment.

FIG. 3 shows a bulkhead 21 according to a second embodiment. In this figure, identical elements carry the same references as in FIGS. 1 and 2.

The bulkhead 21 differs from the bulkhead 1 of FIG. 1 by the absence of the opening 9 in the left center part of the surface 2. The left center part is itself adapted for mounting of the steering column and control pedals of the vehicle. In fact, a blind cavity 22 is made in the surface 2, comprising a hole 23 and four identical threaded holes 24. These elements respectively have the same function as the cavity 16, the hole 17 and the threaded holes 18 of the reinforcement 15 of FIG. 2. The bulkhead 21 finally comprises on its surface 2 three holes 25, the function of which is the same as that of the three holes 19 of the reinforcement 15.

FIG. 3 also shows a mastic seal 26 arranged over the entire outer periphery of the front bulkhead 21, namely on sides 5a, 5b, 6a and 6b. This allows both reinforcement of the seal of the bulkhead 1 and prevention of the transmission of vibrations from one part to another, for example from the bodyshell floor to the front bulkhead of the vehicle. Naturally, a similar seal may be provided around the front bulkhead 1 of FIGS. 1 and 2.

It is noted that the absence of cutout on the front bulkhead of the invention, at the level of the tunnel, reduces the length of the periphery of the front bulkhead and hence reduces the length of the mastic seal. The result is a material saving.

Also, as indicated above, the bulkhead may be produced by deep-drawing from a rectangular metal sheet. The absence of cutout for the tunnel and the integration of the wheel arches in a solid portion allows a reduction in the cost price for production of the bulkhead and an improvement in its structure and corrosion resistance.

The invention claimed is:

1. A front bulkhead for a motor vehicle, comprising
a bodyshell floor fitted with a tunnel comprising a lower edge, an upper edge, and two lateral sides, including a left lateral side and a right lateral side,
wherein the lower edge and the upper edge are substantially parallel continuously from the left lateral side to the right lateral side, the lower edge having no cutout at a junction with the tunnel of the bodyshell floor of the vehicle, the lateral sides having solid portions incorporating a shape of wheel arches.

2. The bulkhead as claimed in claim 1, further comprising a first substantially vertical surface arranged at a front of the bulkhead, and a second adjacent surface inclined towards a rear of the bulkhead when the bulkhead is mounted in the vehicle.

3. The bulkhead as claimed in claim 1, wherein the solid portions incorporating the shape of the wheel arches comprise a junction surface of substantially conical and curved form.

4. The bulkhead as claimed in claim 2, wherein the first surface is to receive pedals and a steering column mounted thereon.

5. The bulkhead as claimed in claim 2, further comprising an opening made in the first surface and configured to receive a separate reinforcement mounted thereon.

6. The bulkhead as claimed in claim 2, wherein the first surface includes a blind cavity in which four threaded holes are made.

7. The bulkhead as claimed in claim 2, wherein the second surface has a recess forming a hollow body, configured to house an end of the tunnel of the bodyshell floor of the vehicle.

8. A motor vehicle comprising:
a bodyshell floor fitted with a tunnel extending in the longitudinal direction of the vehicle; and
the bulkhead as claimed in claim 1.

9. The vehicle as claimed in claim 8, wherein a mastic seal is arranged along the lower edge, the upper edge, and the lateral sides of the front bulkhead.

10. The bulkhead as claimed in claim 1, wherein the bulkhead consists of a single piece of shaped sheet metal.

11. The bulkhead as claimed in claim 7, wherein the recess includes a surface portion that is more inclined than the second surface.

12. The vehicle as claimed in claim 8, wherein the tunnel does not pass through the bulkhead.

* * * * *